May 23, 1972  O. E. CAROTHERS ET AL  3,664,550

DISPENSING SYSTEM FOR BEVERAGES AND OTHER LIQUIDS

Filed May 22 1970  6 Sheets-Sheet 1

INVENTORS
OLEN E. CAROTHERS
OLIVER E. HINKLE
BY
Perry E. Turner
ATTORNEY

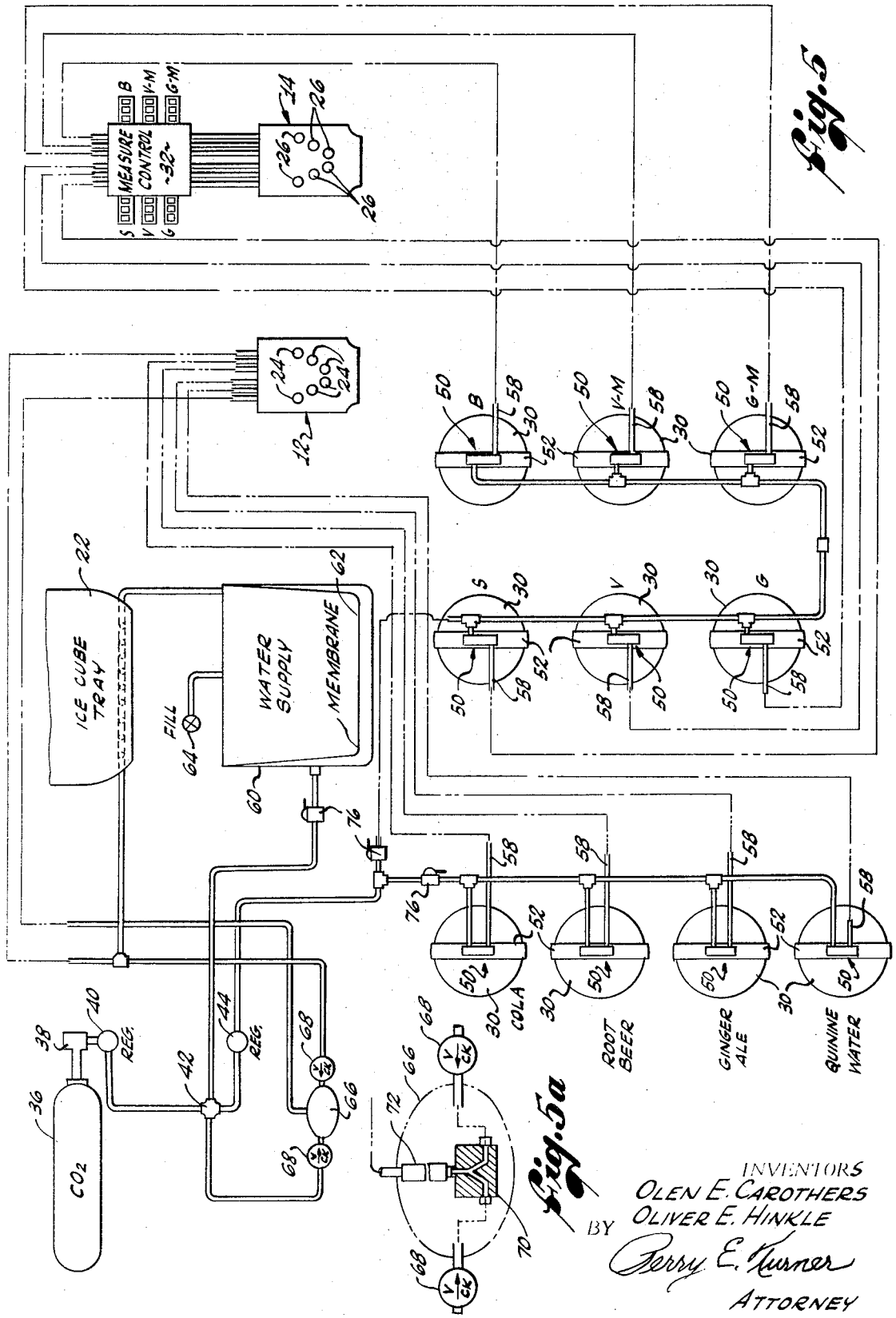

May 23, 1972  O. E. CAROTHERS ET AL  3,664,550
DISPENSING SYSTEM FOR BEVERAGES AND OTHER LIQUIDS
Filed May 22 1970  6 Sheets-Sheet 3
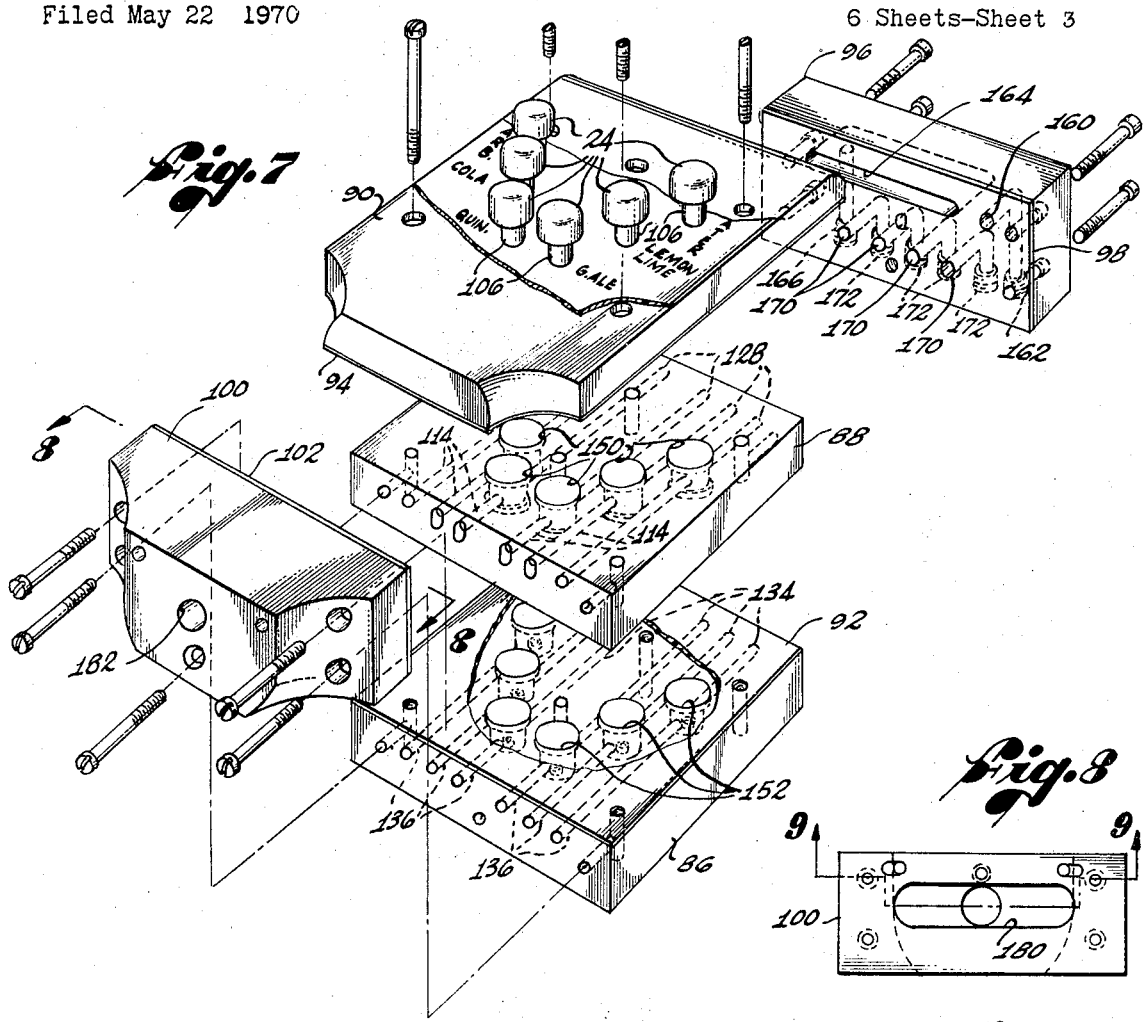
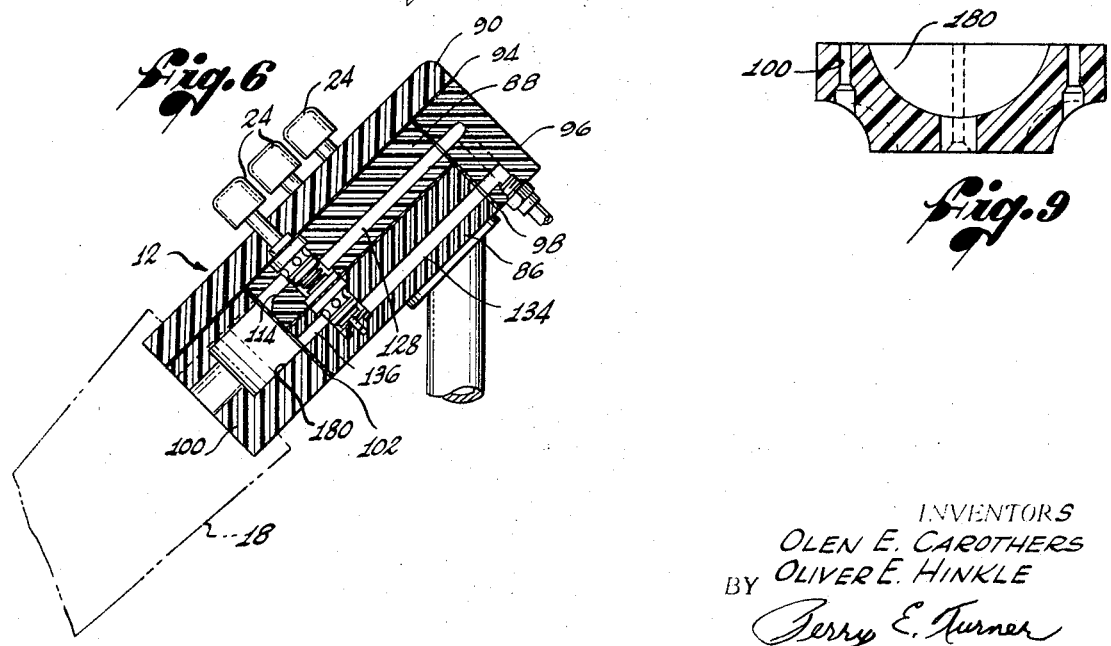
INVENTORS
OLEN E. CAROTHERS
OLIVER E. HINKLE
BY
Berry E. Turner
ATTORNEY

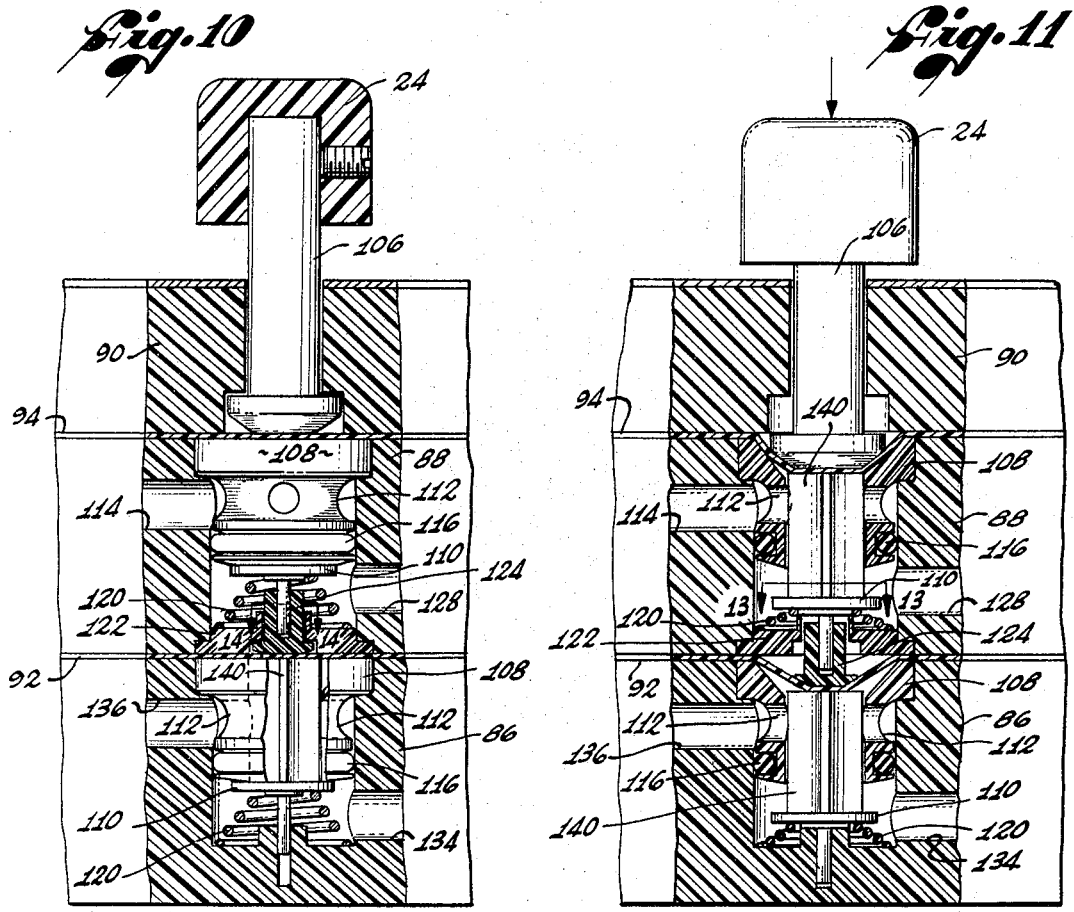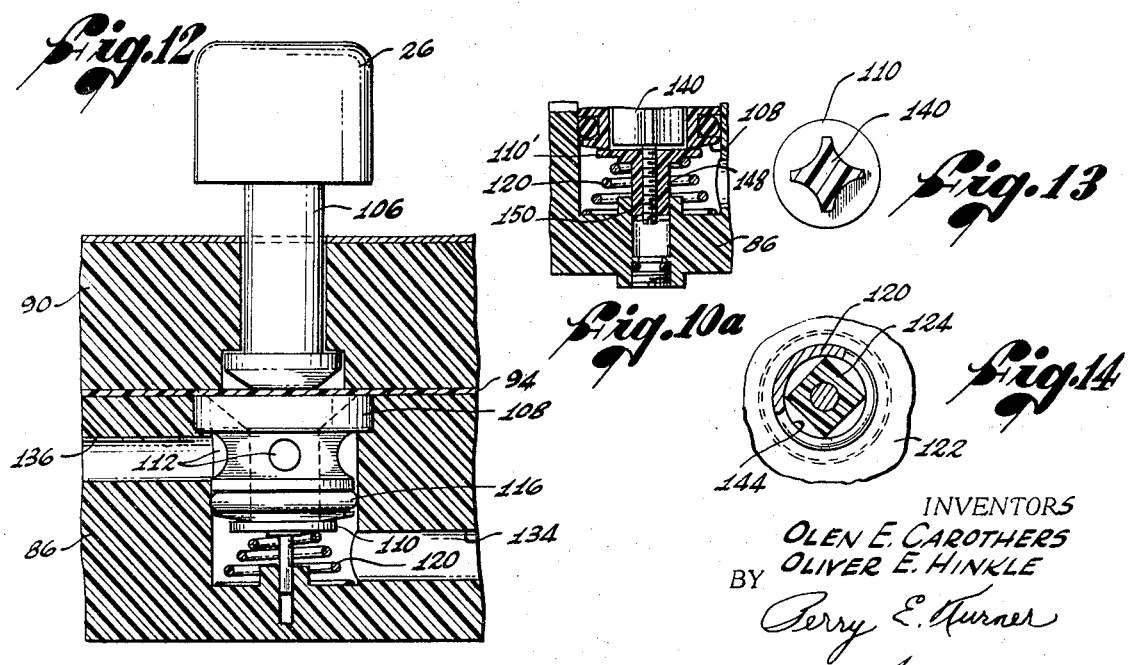

May 23, 1972  O. E. CAROTHERS ET AL  3,664,550
DISPENSING SYSTEM FOR BEVERAGES AND OTHER LIQUIDS
Filed May 22 1970  6 Sheets-Sheet 5
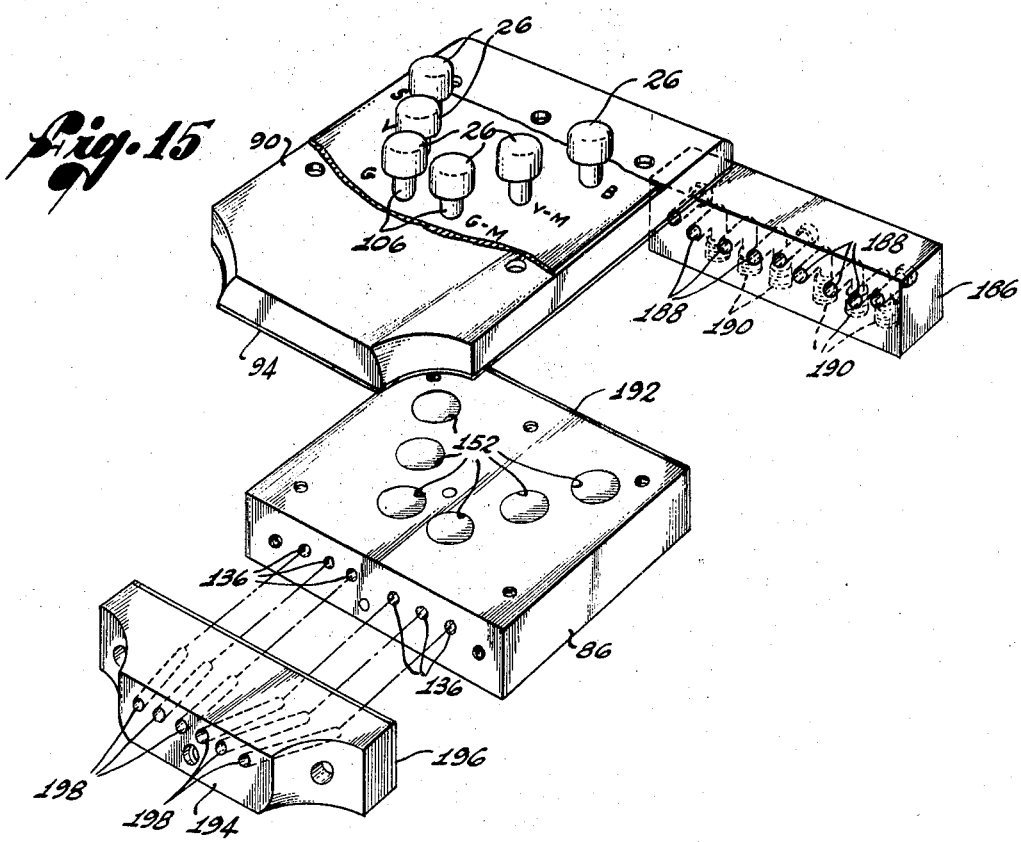
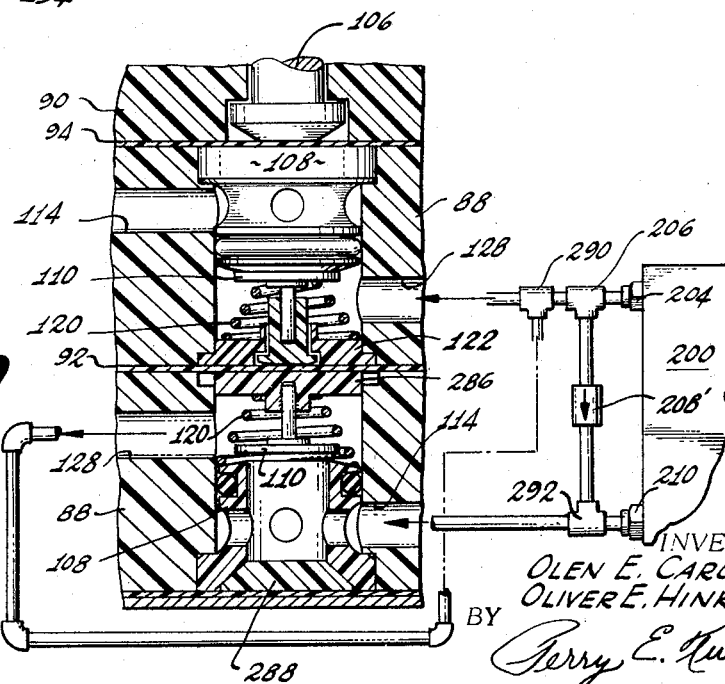
INVENTORS
OLEN E. CAROTHERS
OLIVER E. HINKLE
BY
Perry E. Turner
ATTORNEY

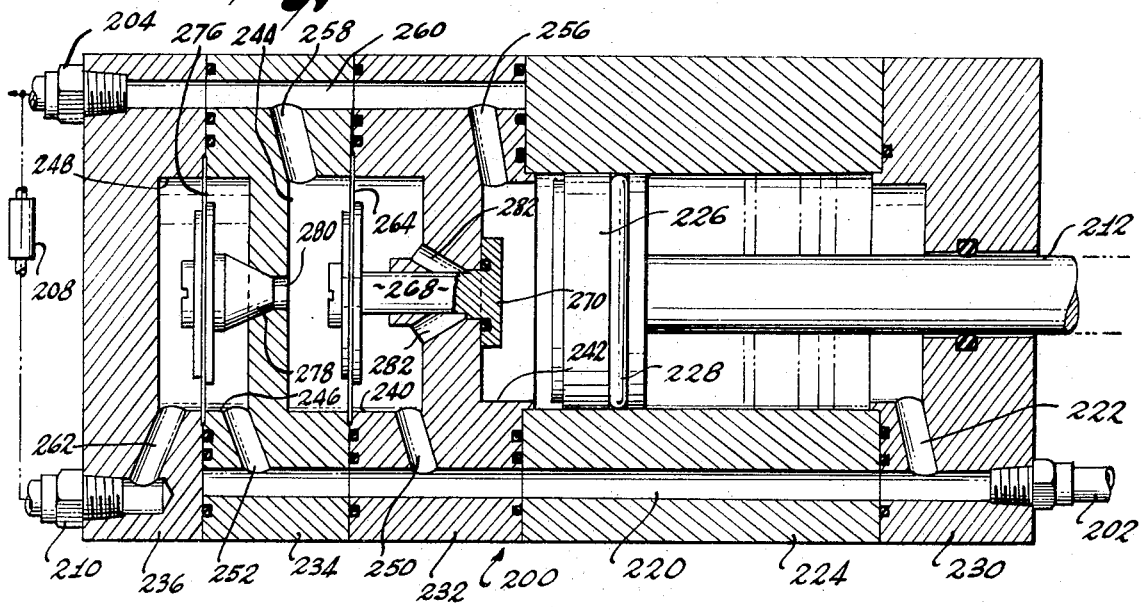
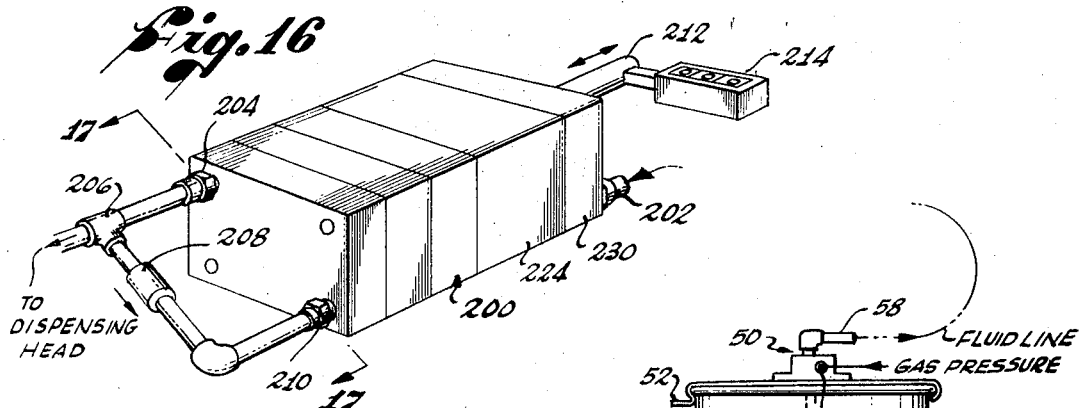
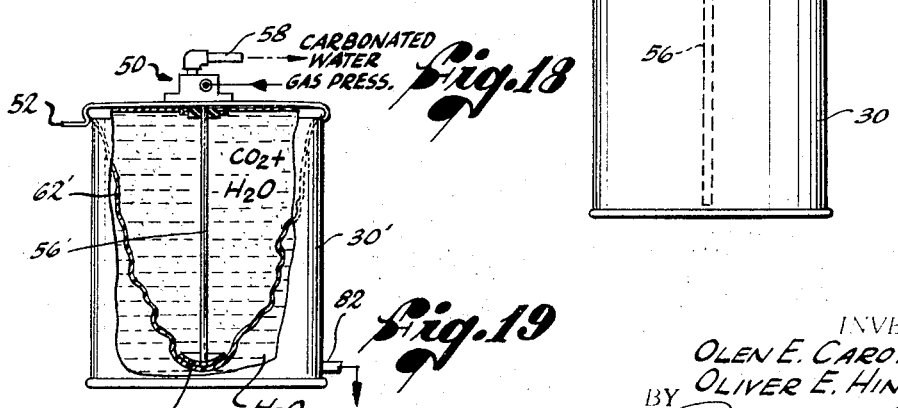

United States Patent Office 3,664,550
Patented May 23, 1972

3,664,550
DISPENSING SYSTEM FOR BEVERAGES AND OTHER LIQUIDS
Olen E. Carothers, 15749 Gault St., Van Nuys, Calif. 91406, and Oliver E. Hinkle, 16012 Acre St., Sepulveda, Calif. 91343
Filed May 22, 1970, Ser. No. 39,586
Int. Cl. B67d 5/56
U.S. Cl. 222—129.2     19 Claims

ABSTRACT OF THE DISCLOSURE

A liquid dispensing system is shown wherein a plurality of containers of water, syrups and liquors are connected to a source of carbon dioxide under pressure, and which have fluid outlets connected to ported dispensing heads containing pushbutton controlled valves for the different liquids. The $CO_2$ provides the pressure for forcing liquid from a container and through a dispensing head when the associated pushbutton is operated. For the liquors, hydraulic measure control valves are connected between the containers and respective ports in the liquor dispensing head. For obtaining carbonated water, different versions are disclosed which include a carbonator connected between the water container and a dispensing head for utilizing the $CO_2$ pressure as the force for mixing the $CO_2$ with and carbonating the water; and insulated containers for either or both carbonated water and plain water, wherein the $CO_2$ pressure is utilized to force either type of water from the container upon operation of the associated pushbutton at the dispensing head.

BACKGROUND OF THE INVENTION (1) Field of the invention

This invention relates to dispensing systems for beverages and other fluids.

(2) Description of the prior art

Self-contained liquid dispensing systems are known for fountains, bars and the like in which to dispense liquids from containers via dispensing heads, wherein the containers are connected to a cylinder of carbon dioxide for forcing the liquids to the dispensing head, from which they are dispensed by manually operating respective valves therein. The same pneumatic pressure is utilized to carbonate and dispense water via a respective dispensing head valve.

Attempts have been made to provide such a system in which liquids can also be dispensed in quantities. For this purpose, however, it has not been known to both measure and dispense via pneumatic pressure. In the known approach, control of quantities of liquids dispensed is effected through electrical means operating cojointly with pneumatic means. For example, pneumatic pressure is used to force liquid from a bottle into a float chamber, and thence through a solenoid-actuated valve. When a button for the liquid is pressed, a capacitor is charged. Releasing the button causes the capacitor to discharge through and energize a relay, which operates via additional circuitry to energize a solenoid that opens the dispensing valve. Regulation of the quantity of liquid dispensed is determined by the electrical size of the capacitor and adjustment of the dispensing valve.

Where such electrical apparatus operates on house voltage supply, the system is not truly self-contained and self-powered. If portable electrical generators are used, their bulk and weight cannot be tolerated where space and weight are at a premium, as in aircraft, trailers and the like, and make them undesirable for small or portable units, such as carts in large aircraft or as small fountains and bars to be set up on short notice in conventional halls or at outdoor gatherings.

SUMMARY OF THE INVENTION

This invention embraces a system for selectively dispensing measured quantities of a plurality of liquids through manually operable valves in ported dispensing heads, wherein the liquids are in containers that are under pneumatic pressure, and wherein a respective measure control means connected between such container and the dispensing head has a piston that is powered by the liquid and has a predetermined stroke to effect dispensing of a given quantity of the liquid. Also embraced is such a system that includes dispensing head means for mixing liquids with carbonated water, as well as specific structural features for measure control devices, mixer dispensing heads, containers and carbonator.

BRIEF DESCRIPTION OF THE DRAWINGS

FIG. 5 is a schematic diagram of a liquid dispensing system in accordance with the invention;

FIG. 5a is a schematic diagram of the carbonator of FIG. 5;

FIG. 6 is a sectional view taken along the line 6—6 of FIG. 4;

FIG. 7 is an exploded view of the associated parts of the syrup and water dispensing head;

FIG. 8 is a view in elevation taken along the line 8—8 of FIG. 7;

FIG. 9 is a sectional view taken along the line 9—9 of FIG. 8;

FIG. 10 is a sectional view of one of the valve structures in the syrup and water dispensing head, with the valves in normally closed position;

FIG. 10a is a fragmentary sectional view of the syrup block modified to accommodate adjusting means operable from the exterior;

FIG. 11 is a sectional view, like FIG. 10, showing the valves in open positions for dispensing liquors;

FIG. 12 is a sectional view of one of the valves in the liquor dispensing head;

FIG. 13 is a sectional view taken along the line 13—13 of FIG. 11;

FIG. 14 is a sectional view taken along the line of FIG. 10;

FIG. 15 is an exploded view of the parts of the liquor dispensing head;

FIG. 16 is a perspective view of a measure control valve structure for the liquor dispensing portion of the system;

FIG. 17 is a longitudinal sectional view of the apparatus of FIG. 16;

FIG. 18 is a view in elevation of one of the containers of FIG. 5 for syrups and liquors;

FIG. 19 is a view in elevation, partly broken away, of a container of the type shown in FIG. 18, adapted for dispensing both plain water and carbonated water; and FIG. 20 is a fragmentary sectional view, similar to FIG. 10, and showing modified measure control means.

DESCRIPTION OF ILLUSTRATIVE EMBODIMENTS

Figure 1:
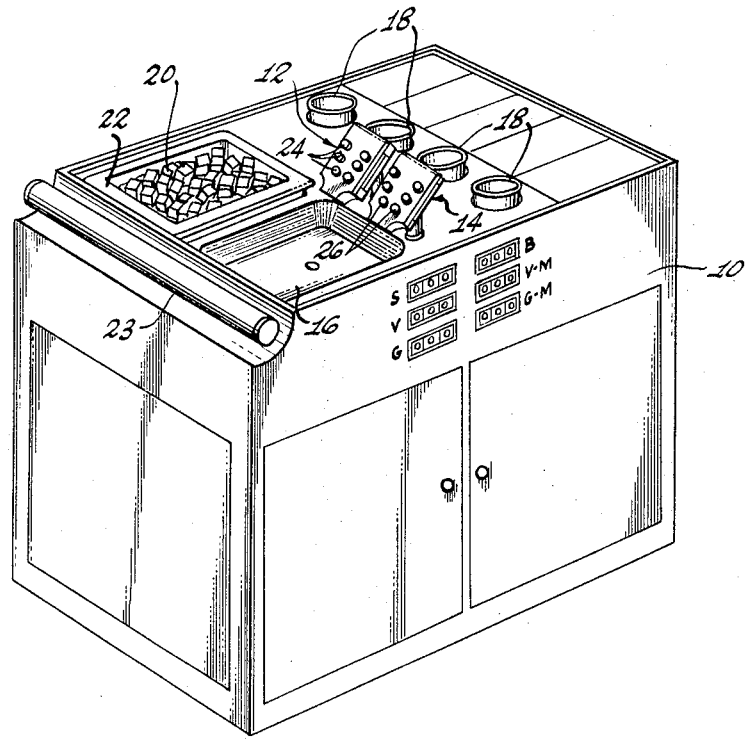
FIG. 1 is a perspective view of a small fountain and bar cart or stand for dispensing liquids in accordance with this invention.

Referring to FIG. 1, a self-contained liquid dispensing system in accordance with the invention is shown as a portable unit having a housing 10 with a service top wherein a pair of dispensing heads 12, 14 are mounted at an angle with their lower outlet ends disposed over a sump 16. Glasses 18 are nested in cutouts in the service top, and ice cubes 20 are placed in a deep tray 22 that is set into the service top.

The service top may include a variety of trays or bins for napkins, condiments, etc., and a cash box may be slidably mounted in one end or side of the housing. The unit may be adapted as a cart, for which wheels or casters (not shown) may be mounted under the bottom of the housing. An elongated hand grip 23 mounted on one end of the housing is provided to facilitate pushing and pulling the cart to different locations.

The dispensing head 12 in one arrangement serves as means for dispensing syrups, plain water and carbonated water, and has respective pushbuttons 24 for these liquids. When a customer desires a particular carbonated beverage for which a syrup is available, ice cubes are placed in a glass which is positioned under the lower end of dispensing head 12. Upon pressing a pushbutton 24 for a particular carbonated beverage, operation of valves in the head causes a mixture of carbonated water and syrup for that beverage to be dispensed into the glass in a predetermined ratio, e.g., five parts carbonated water and one part syrup. If a person desires only plain water, the pushbutton marked for that purpose is pressed, whereupon only plain water is dispensed into a glass placed under the head 12.

The dispensing head 14 in this arrangement is used to dispense liquors and pre-mixed alcoholic beverages, and respective pushbuttons 26 are provided for dispensing these liquids through respective valves in this head. Where a customer desires that plain water or carbonated water be added to his drink, the glass after the liquor dispensing operation is placed under the dispensing head 12, where the appropriate pushbutton 24 is pressed to dispense the type of water requested.

As previously indicated, each of the liquids is provided in a respective container mounted in the housing 10. For certain liquids, it may be desired to keep a tally of the number of drinks dispensed. For example, it may be desired to keep track of the number of liquor dispensing operations. For this purpose the housing 10 is shown provided with windows, which may be in a side panel or a service top panel, in which the numbered wheels of six Veeder-Root counters are visible, with legends adjacent the windows being selectively marked for the different liquors, e.g., S (scotch), B (bourbon), V (vodka), V-M (vodka martini), G (gin) and G-M (gin martini). The top surface of the head 14 (FIG. 15) is shown to be similarly marked adjacent its pushbuttons.

Each of the counters serves to alert the operator when the associated liquor containers need to be replaced. Thus, where it is known that the volume of liquor in a container is such that a hundred equal measurements of the liquor are dispensed therefrom, the counter therefor can be reset to zero when a filled container is placed in the housing 10, and at the count of one hundred the operator will know to remove the empty container and replace it with a filled one. If desired, a totalizer counter may also be provided, e.g., one for all dispensing operations, for all liquors, or one each for each liquor.

Figure 4:
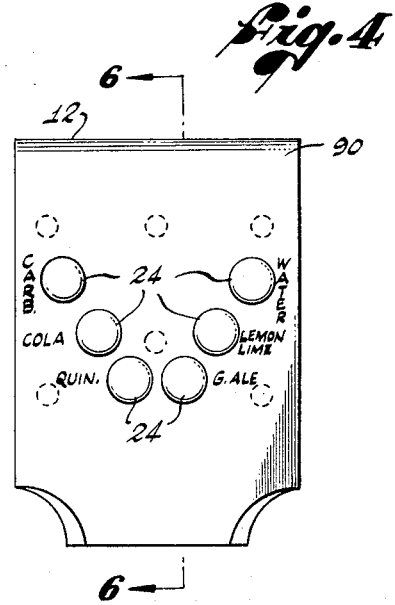
FIG. 4 is a plan view taken along the line 4—4 of FIG. 2.
Figure 3:
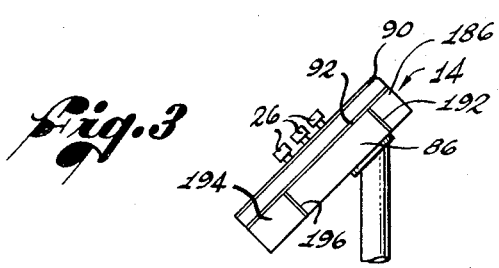
FIG. 3 is a side elevation view of the liquor dispensing head.

FIG. 5 illustrates a self-contained liquid dispensing system of the invention for the above-described portable unit. For the liquor dispensing head 14, six containers marked S, V, G, B, V-M and G-M have respective output lines coupled to respective input ports of the head 14 via measure control apparatus 32. Four similar containers 30, three of which are indicated as containers for syrups for cola, lemon-lime and ginger ale, and the fourth for quinine water, are connected through respective lines to respective input ports of the head 12. In FIG. 4, the top of the head 12 is shown with appropriate legends adjacent its pushbuttons. Each of the containers 30 is connected to a source of gas under pressure, shown as a cylinder 36 of carbon dioxide.

The cylinder 36 is provided with a conventional manual cutoff valve 38, and a regulator 40 is connected between the valve 38 and a coupling 42, to which the containers 30 are connected through a regulator 44. By this means, a pressure head is established in all containers 30 which is sufficient to cause the liquid therein to flow through the heads 12, 14 when the valves therein are operated by the pushbuttons.

In this connection, and referring to FIG. 18, a container structure for the liquid containers 30 is shown in which a fitting 50 is secured to a bail 52 that is adapted to be releasably clamped to the top of the container. The fitting 50 has a gas pressure inlet port 54, and a siphon tube 56 extending through the top of the container 30. The siphon tube 56 preferably is inserted through a grommet in the top of the can, and is fluted so as to permit the $CO_2$ gas to enter the container through the grommet. The pressure is sufficient to force fluid into the lower end of the tube 56 and upwards through the fitting 50, from which it passes through a fluid line 58 to the appropriate dispensing head.

Referring again to FIG. 5, pressure from the cylinder 36 is also utilized in that arrangement for dispensing plain water. To this end, the coupling 42 is shown connected to a container 60 so that the $CO_2$ pressure is applied to a gas-impenetrable membrane 62 that contains plain water. The membrane 62 preferably is a collapsible plastic membrane, and in this example is indicated to be sealed to the upper end of the container 60. A valve 64 is provided through which to fill the membrane 62 with plain water, if desired, from a faucet. However, the water supply may simply be obtained from a stock of filled cartons which can be thrown away after their contents are poured into the membrane. Such water supply is connected to one of the inlet ports of the dispensing head 12, so that upon pressing the pushbutton 24 marked for plain water, the gas pressure against the membrane 62 forces water out of the membrane and through the head 12.

Still further the carbon dioxide from the cylinder 36 is actually used in this arrangement to make carbonated water. To this end, a mixing chamber 66 is connected to the cylinder 36 (by connection to coupling 42) and to the water supply through respective check valves 68. Still further in this connection, in order that the water entering the mixing device 66 is sufficiently cold to achieve the desired mixing of the $CO_2$ therewith, it is desirable that suitable means be provided for cooling the water. In this example, this is accomplished by arranging the line from the water supply to pass through or along the bottom of the ice cube tray 22. The portion of the line in this area preferably is made serpentine, so that the ice cubes in the tray will effect a sufficient heat exchange to insure that the temperature of a sufficient amount of water in the line is maintained at the desired temperature, e.g., to 34° F. An output line is connected from the mixing chamber 66 to the head 12, where operation of the pushbutton marked therefor will cause only carbonated water to be dispensed. This arrangement also insures that plain water dispensed through the head 12 will be cold.

Referring to FIG. 5a, the check valves 68 are connected to a Y-fitting 70, with the arm through which $CO_2$ gas is supplied having an orifice at the junction that is dimensioned to create considerable turbulence and consequent thorough mixing of the gas with the water to achieve the desired carbonation. The center leg of the Y-fitting 70 may be directly connected to the dispensing head 12. If it is desired to effect additional mixing, a mixing device 72, which preferably is a static mixer, is connected between the center leg of the Y-fitting and head 12.

The above-described structure for the liquid containers also facilitates their easy removal and replacement. When it is desired to replace an empty container with a full one, the pressure head is removed. For this purpose, the lines connecting the liquor containers and the syrup and quinine water containers to the regulator 44 are provided with vent valves 76. Each such valve has an "operate" position in which the gas pressure inlet ports of the fittings 50 are connected to the $CO_2$ cylinder 36, and a "service" position in which such ports are disconnected from the cylinder and the pressure in the containers 30 are vented to atmosphere. Following such venting, the bail 52 is released from the container and the siphon tube drawn out of the container. When a new container is in position, the siphon tube is forced through the grommet to the position shown in FIG. 18, and the bail 52 is snapped in place over the top of the container.

It should be noted that a container 30 as above described can also be used to supply carbonated water. Preferably, such a container is filled with carbonated water of the desired temperature, and the container is well insulated so as to keep the carbonated water at that temperature over a substantial period of time. In such case, the $CO_2$ from the cylinder 36 functions both to supply the pressure needed to cause the water to flow through the siphon tube and the dispensing head when the appropriate pushbutton is actuated, and to effect additional mixing of $CO_2$ with the water.

Still further, the invention embraces the use of such containers for plain water. Thus, the container 60 for the water supply may be an insulated container shaped as one of the containers 30. The same bail and fitting thereon may be used. In such case, a variety of modifications may be employed to effect flow of water from the container when the appropriate pushbutton is operated. In one example, the gas inlet port to the fitting 50 is closed off, the siphon tube is only long enough to enter the interior of the container, and the container is inverted when in use. In such case, gas pressure on the membrane forces the water to flow out of the bottom of the container and through the fluid line to the dispensing head.

In another example using such an insulated container, gas pressure is applied through the bail fitting 50 as for other liquids, i.e., the gas connection to the container as shown in FIG. 5 is eliminated. In this arrangement, the fluid outlet from the bail fitting 50 is closed off, and the container is provided with a fluid outlet in its lower end. For this embodiment, the container is inverted to be filled with water through its outlet connection. When the container is filled, the membrane is collapsed against the top of the container. After filling, this container is set upright with its outlet fitting connected through a line to the dispensing head 12. Accordingly, gas pressure applied through the bail fitting 50 causes the membrane to expand and thereby force water out of the lower end of the container and through the line therefrom to the dispensing head. By the time the container is empty, the membrane will have been unfolded so as to conform to the interior walls of the container. As in the previously mentioned modification, no siphon tube is employed in this arrangement.

FIG. 19 illustrates a container structure in accordance with the invention for dispensing either plain or carbonated water. Container 30' is an insulated container, and is shown with the same fitting 50 and bail 52 arrangement previously described. In this embodiment, a modified siphon tube 56' is employed which has a dish-like attachment on its lower end indicated at 80, such siphon tube extending into a membrane 62' that is secured at its upper end around the top of the container. Carbonated water is placed in the interior of the membrane 62', and the space surrounding the membrane is filled with plain water. An output line 82 for the plain water is shown at the bottom of the container.

Initially the container 30' is filled with plain and carbonated water in the desired proportions, e.g., one-third plain water and two-thirds carbonated water. If, for example, the container is a three-gallon container, it may be inverted and a gallon of plain water introduced through the fitting 82. The container is then set upright and two gallons of carbonated water are poured into the interior of the membrane 62'. Then the bail 52 with the fitting 50 thereon is clamped over the top of the container.

For dispensing carbonated water, operation of the appropriate pushbutton results in the same dispensing operation previously described for liquids in the container 30, i.e., gas pressure forces carbonated water to flow into the bottom of the tube 56' and upwardly through the fitting 50 and the dispensing head. For plain water, operation of the appropriate pushbutton results in the membrane 62' being expanded or unfolded under the combined pressures of the carbonated water and gas pressure, to effect flow of plain water out of the fitting 82 and through the dispensing head. The membrane 62', as with the membrane 62 previously described in connection with FIG. 5, is sufficiently large that when all of the plain water is dispensed from the container, the membrane conforms to the interior walls of the container.

Figure 2:
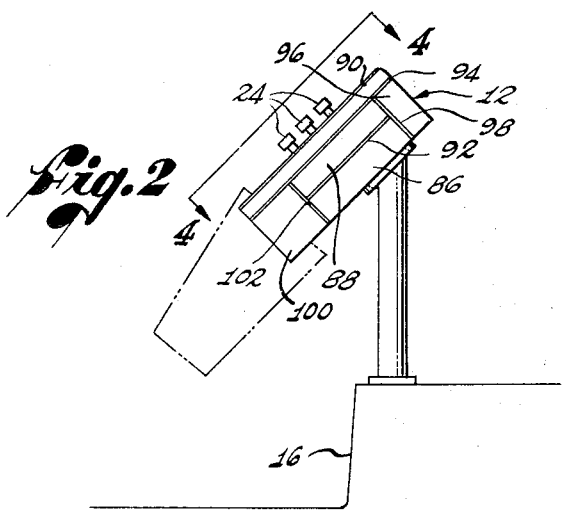
FIG. 2 is a side elevation view of the syrup and water dispensing head.

Details of the syrup and water dispensing head 12 and the valves therein are shown in FIGS. 6–14. With reference to these figures along with FIG. 2, the dispensing head 12 is formed of a pair of ported blocks 86, 88 and a top block 90 that are stacked and secured together, with a gasket sheet 92 sandwiched between the blocks 86, 88 and a gasket sheet 94 sandwiched between the blocks 88, 90. At the upper end of the stacked blocks 86, 88, a liquid input manifold block 96 is secured thereto, with a gasket sheet 98 sandwiched between the confronting faces of the blocks 86, 88, 96. At the lower ends of the blocks 86, 88, a discharge manifold block 100 is secured thereto, with a gasket sheet 102 secured between the confronting faces.

The five blocks preferably are of molded plastic and the gasket sheets are of plastic material compatible with the liquids to be dispensed. For example, for beverages of the type herein described, the blocks may be injected molded parts of polyvinylchloride and polypropylene, and the gasket sheets may be formed of polyurethane. Where it is desired to dispense other liquids, e.g., oils, acids, or various chemical liquids, the parts are formed of materials suitable to accommodate these liquids, and may in fact be formed of plain or anodized metals, rubber, etc. The gasket sheets 98, 102 may also be eliminated where desired, as by coating the confronting faces of the blocks with suitable adhesives before assembling them together.

The gasket sheets 92, 94 are solid sheets of pliable or flexible material through which pushbutton movements are are transmitted to valve structures housed in the blocks 86, 88. For use in dispensing beverages, and wherever possible for use in dispensing other liquids, it is preferable to form all parts of the valve structures of plastic material, e.g., injection molded parts of the same material as the blocks. The invention, of course, embraces the described parts made of various metals.

As best seen in FIGS. 6, 7, 10 and 11, each pushbutton is formed with a knob on the outer end of ap in 106 that extends into the top block 90, with the lower end of the pin resting against the gasket sheet 94. Within the block 88 is a valve structure which is shown to include a tubular element 108 having a flanged upper end that seats on a shoulder in the block 88. The lower end of the tubular element 108 constitutes a valve seat for a valve head 110. Immediately below the flanged end thereof, the tubular element 108 has a groove with a number of openings 112 therein, and an outlet port 114 aligned with the groove extends to the lower end face of the block 88. Between the openings 112 and the lower end of the tubular element is a fluid seal, shown as an O-ring 116 fitted around the tubular element and sealingly engaging the surrounding walls of the opening in which the element is inserted.

The valve head 110 is normally spring biased into seating engagement with the lower end of the tubular element 108, as by a compression spring 120 extending between the head 110 and the upper surface of a ring 122. The ring 122 is stationary, and is shown in this example with a flange having its upper surface seated against an annular shoulder in the block 88. The lower surface of the ring 122 rests on the gasket sheet 92. The valve head 110 is supported by the ring 122 for axial sliding movement. In this connection, the valve head has an integral stem that is secured in a button-like element 124 that is slidably mounted in the ring 122. The lower end of the element 124 rests against the gasket sheet 92.

Between the lower end of the tubular element 108 and the ring 122 is an inlet port 128. So long as the valve head 110 is seated against the lower end of the tubular element 108, there is no fluid connection between the inlet port 128 and the outlet port 114. For the purposes of dispensing beverages, the valve head and its stem are formed of a material that will have no chemical action with the liquids. Thus, the valve head and stem may be formed of a food grade stainless steel, or a plastic material similar to that of the block 88. So that the valve head will properly seat against the tubular element 108, may be coated with a suitable elastomer, e.g., a nitrile (Buna N) compound, or copolymer of butadiene and acrylonitrile.

The lower block 86 has an opening aligned with that in the block 88, and contains another tubular element 108, valve head 110 with integral stem and spring 120 as above described. However, in this case the valve stem is shown to be slidable in an opening in the block 86. With the valve head 110 seated against the lower end of the tubular element 108 as shown, the valve blocks off fluid communication between an inlet port 134 below the lower end of the tubular element 108 and an outlet port 136 with which the openings 112 in the tubular element are in fluid communication. The O-ring seal 116 prevents passage of fluid between the ports along the outer surface of the tubular element.

When the pushbutton is pressed, the valve heads 110 in the two blocks 86, 88 are simultaneously moved off their valve seats, thereby to permit fluid communication between the associated inlet and outlet ports. For this purpose, valve transfer rods 140 are slidably mounted in the tubular elements 108. Thus, when the valve heads 110 are seated against the lower ends of the tubular elements 108, the lower ends of the rods 140 rest on the upper surfaces of the valve heads 110, and the upper ends of such rods engage the lower surfaces of the gasket sheets 92, 94.

Accordingly, when the pushbutton is depressed, both transfer rods 140 are forced through their tubular elements 108 to unseat the valve heads 110 from the lower ends of the tubular elements, whereby fluid under pressure in the inlet ports 128, 134 are allowed to flow upwardly through the tubular elements and out of the openings 112 through the outlet ports 114, 136. The rods 140 are suitably shaped, e.g., cruciform in cross section in this example (see FIG. 13), so that liquid flows easily through the tubular elements 108.

When the pushbutton is released from the position shown in FIG. 11, the actions of the springs 120, which are further compressed on the down strokes of the valve heads, cause the valve heads bearing against the lower ends of the rods 140 to force the rods upwardly through the tubular elements 108 until the valve heads seat against the lower ends of the tubular elements. This action preferably is substantially instantaneous, and for this purpose it is preferred to form the opening in the ring 122 and the outer surface of the button 124 so that any fluid passing between them on the downstroke is not trapped or constructed so as to impede upward movement when the springs are released. The valve pin and surrounding wall of the opening in the block 86 are also appropriately shaped for the same purpose.

Referring to FIG. 14, the button 124 is shown to be square in cross section, and the ring 122 is shown to have a circular opening 144. As will be apparent, fluid from the inlet port 128 enters the space below the valve head 110, including the space between the confronting surfaces of the button 124 and the surrounding walls of the ring 122. On the downstroke, fluid also fills the space between the upper surface of the gasket 92 and the lower surface of the ring 122. However, by virtue of the shapes of these elements, the liquid readily passes upwardly between them as the spring 120 forces the valve head upwardly.

Since the valve stem in the lower block 86 does not carry such a button, it is sufficient for a cylindrical pin to form a square or other non-circular opening for the pin to ride in. Alternatively, the opening may be circular and the valve stem non-circular cross section.

FIG. 10a shows an arrangement to permit adjustment to be made to accommodate tolerance mismatches wherein a valve transfer rod 140 is shorter than the axial length of the tubular element 108 in which it is located. As will be appreciated, this situation would result in some movement of the rod actuating button before the valve head 110 is moved off its seat. To insure movement of the valve head off its seat simultaneously with movement of the pushbutton, the valve head 110' is shown with a tapped enlarged stem 148. Threaded in the stem 148 is an adjusting pin 150 which has a screwdriver slot at its lower end. The pin 150 is turned until its upper end engages the lower end of the transfer rod 140 and moves it to a position such that its upper end engages the gasket sheet when the valve head 110' seats against the lower end of the tubular element 108.

Desirably, the lower ends of the pins 106 and the button 124 are smoothly contoured, as are the inner surfaces of the upper ends of the tubular elements 108, so as to avoid working the material of the gasket sheets 92, 94 against any sharp edges, thereby to eliminate the possibility that the sheets could be ruptured over a prolonged period of use. Further, as shown, the parts may be suitably shaped to limit their upper positions. In this connection, the lower ends of the pin 106 and button 124 are flanged to engage respective shoulders in the lower faces of the block 90 and the ring 122.

Referring again to FIG. 7, the block 88 is shown with openings 150 for the above-described valve structures positioned in alignment with the pins 106 of the pushbuttons 24, and the block 86 is shown with openings 152 aligned with the openings 150. As will be apparent, the inlet and outlet ports to and from these openings are necessarily of different lengths because of the different positions of the openings.

For the dispensing head above described, the lower block 86 will be referred to as the syrup block, and the block 88 will be referred to as the water block. For dispensing beverages as above described, the inlet manifold block 96 is adapted to connect the outlet lines from the three syrup and quinine water containers to four of the inlet ports 134 in the lower block 86. Thus, two of the inlet ports 134 are not used. In this connection, and as will become apparent hereinafter, the lower block 86 is identical to the lower block of the liquor dispensing head. For the dispensing head 12, the block 86 could be formed with only four openings 152 with valve structures therein to be operated as previously described. However, for the sake of convenience in minimizing costs of manufacture, it is simpler to provide identical parts which can be used in either type of dispensing head. For this same reason, the top block 90 is identical to that used in the liquor dispensing head.

For the two portions in the syrup block which are not used, it is only necessary to fit a tubular element 108 in each of the openings. Alternatively, a ring of the size of the flanged portion of a tubular element may be inserted in each of these locations. Such elements serve to provide space to permit downward movement of the gasket sheet 92 and button 124 for each valve structure in the water block that is operated to dispense plain water or carbonated water only.

For the water block 88, the inlet manifold block 96 is adapted to connect the line from the plain water supply to one of the inlet ports 128, and to connect the line from the carbonated water supply to the remaining five inlet ports 128. In this latter connection, when pressing any of the four buttons 24 associated with valves in the syrup block 86 to which liquids are connected through the inlet manifold block 96, there is a simultaneous flow of the selected liquid through the syrup block 86 and of carbonated water through the water block 88. The remaining button 24 of these five effects flow of carbonated water only through the water block.

For the above-described purposes, the inlet manifold block 96 is shown with an outlet port 160 that is aligned with the right-hand inlet port 128 in the water block 88. The lower surface of the block 96 is suitably adapted, as at 162 to receive a fitting for connection to the line from the plain water supply. The block 96 is also shown with an elongated outlet opening or manifold 164 in which the upper end of a port through the bottom of the block terminates, such port being adapted at 166 to receive a fitting for connection to the line from the carbonated water supply. Thus, when any of the remaining five pushbuttons is operated, carbonated water flows through the manifold 164 and into each of the remaining five inlet ports 128. For the liquids from the syrup containers, the block 96 is provided with four outlet ports 170 aligned with four of the inlet ports 134 in the syrup block 86, such ports 170 being adapted at 172 to receive fittings for connection to the respective syrup and quinine containers.

All output ports 114 and 136 in the water block and syrup empty into a mixing cavity 180 in the discharge manifold block 100 (see FIGS. 6, 8 and 9). The cavity 180 terminates in a reduced diameter opening 182 in the end of the block 100. The cavity is smoothly contoured and shaped so that it effects thorough mixing of liquids through the syrup block 86 and carbonated water through the water block 88, whereby the carbonated beverage passing through the outlet port 182 is thoroughly mixed and requires no stirring.

Further, the carbonated water and liquid from the syrup block are in the proper proportions. So this end, the associated outlet ports 114, 136 are suitably dimensioned to effect the desired proportioning. In one arrangement, this may be accomplished by suitably shaping the outlet ports 114, 136 to provide orifices which will insure, for example, that five parts of carbonated water are dispensed for each part of liquid from the syrup block. If desired, such orificing may be effected by means of metallic pins threaded into the syrup block at right angles to the outlet ports, such pins being adjustably positioned to establish a constricted flow of liquid from the outlet ports. Alternatively, pins may be threaded into the outlet ports and have bores therein forming orifices to effect the desired constricted flow.

An additional advantage that has been realized with this arrangement is that when different syrups are discharged through the syrup block in different operations, there is no residue on the walls of the mixing cavity 180 of the syrup dispensed in the preceding operation. This is due to the action of the carbonated water discharged in the mixing cavity along with the syrup. The force of the carbonated water effects the desired mixing and simultaneously washes the surfaces of the cavity and outlet port 182 thoroughly of the syrup dispensed therewith.

FIGS. 12 and 15 illustrate the arrangement of the parts of the liquor dispensing head 14. In this arrangement, the top block 90 and lower block 86 previously described in connection with FIG. 7 are used for dispensing liquors, and the block 86 here will be referred to as the liquor block. Each of the six openings 152 in the liquor block houses a valve structure as above described. The blocks 86, 90 are secured together with the gasket sheet 92 between them; the lower ends of the pins 106 rest on the gasket sheet; the ends of the valve transfer rod in the tubular elements 108 register against the gasket sheet 92 and the valve head 110 seated against the lower ends of the tubular elements. Accordingly, any pin pushed downwardly directly and instantly moves the associated valve transfer rod to unseat the valve head and connect the inlet and outlet ports 134, 136.

To dispense the liquors, an inlet manifold block 186 is provided with a plurality of ports having outlet openings 188 aligned with respective inlet ports in the liquor block, the ports in the manifold block 186 being adapted at 190 for connection to the lines from the respective liquor containers. The block 186 is secured to the block 86, with a gasket sheet 192 secured between their confronting faces. At its opposite end, the block 86 is secured to a discharge manifold block 194, with a gasket sheet 196 sandwiches between their confronting surfaces, such discharge block having ports 198 which are aligned with the respective outlet ports in the block 86. Thus, there is a separate discharge opening through the block 194 for each liquor.

As previously indicated, it may be desired to establish a predetermined quantity of liquor to be discharged for each operation of the pushbuttons in the liquor dispensing head. In this connection, it should be noted that in both the carbonated beverage and liquor dispensing heads as previously described, liquids are continually discharged as long as the pushbuttons are depressed. For a carbonated beverage, it is sufficient to gauge by sight when a desired quantity is dispensed into a glass, and then to release the pushbutton to cut off the flow. But regardless of the quantity of carbonated beverage dispensed, it contains the same proportions of carbonated water and syrup.

While the quantity of liquor dispensed may be similarly gauged by eye, a number of factors, not the least of which is the substantially higher cost of such liquids, make it desirable to dispense a measured quantity of such a liquid upon each pushbutton operation.

FIGS. 16 and 17 illustrate measure control apparatus for dispensing a predetermined quantity of liquor from one of the containers when the associated pushbutton is depressed. Referring to FIG. 16, a housing 200 has a fluid inlet 202 at one end which is adapted for connection to a fluid line from one of the liquor containers. At its other end, the housing is provided with an outlet 204 for connection to a line leading to an inlet port of the liquor block. A T-shaped coupling 206 is shown for connecting the outlet 204 to the line to the liquor block, and a check valve 208 is connected between the center leg of the T and a feedback connection 210 into the housing 200.

Extending out of the fluid inlet end of the housing 200 is a rod 212, which is indicated to be reciprocally movable. The rod 212 is illustrated as operatively connected to a counter mechanism 214. In operation, when a pushbutton in the dispensing head is operated, fluid entering the housing 200 at 202 causes the rod 212 to be moved inwardly of the housing. After the predetermined quantity of the liquid passes out of the housing at 204, the check valve 208 functions to reset liquid pressures within the housing and permit the rod 212 to undergo a return movement out of the housing. Each such operation of the rod 212 actuates the counter 214 to cause it to display a one digit increase over the total it previously displayed.

Referring to FIG. 17, the fluid inlet 202 communicates with a manifold 220 which has a branch 222 to one end of a cylinder block 224 in which is a slidable piston head 226 that is secured to one end of the rod 212. As shown, an O-ring 228 around the piston provides a seal between the piston and cylinder wall. The rod 212 extends through an end block or cap 230 that is secured to the cylinder block 224.

In addition to the cylinder block 224 and end block 230, the housing is shown to include blocks 232, 234, 236 that are secured together and to the cylinder block. Each of the blocks 232, 234 has recessed openings in its opposite faces, the recesses in the block 232 being indicated at 240, 242, and the recesses in the block 234 being indicated at 244, 246. The end block 236 has a recessed opening 248 in its inner surface.

As shown, branch ports 250, 252 from the manifold 220 extend to the recesses 240, 246 in blocks 232, 234. From the recesses 242,, 244 in these blocks, branch ports 256, 258 extend to a manifold 260 running though the blocks 232, 234, 236 to the outlet 204. Also, a branch port 262 extends from the recess 248 in block 236 to the inlet 210.

Clamped between the blocks 232, 234 is a diaphragm 264 that spans the recesses 240, 244, and attached thereto is a valve structure having a stem 268 extending through the block 232 to an integral valve head 270 within the recess 242. The valve is adapted to seat against the bottom of the recess 242, and an O-ring 272 may be provided to effect desired sealing. Also, clamped between the blocks 234, 236 is a diaphragm 276 that spans the recesses 246, 248, and attached to this diaphragm is a valve element 278 that is shown with a conical surface adapted to seat in a mating countersunk portion of an opening 280 between the recesses 244, 246 of the block 234.

Where the housing 200 is made up of blocks as shown, the manifold 220 is formed of aligned bores through the blocks 230, 224, 232, 234, and the manifold 260 is formed of aligned bores through blocks 223, 234, 236. For such an arrangement, sealing elements are employed in all places where needed in order to prevent leakage of liquid between the faces of the blocks and between the rod 212 and end block 230.

In explaining the operation of the structures of FIGS. 16 and 17 for measure control, let it be assumed that all spaces in the housing are filled with the liquid from one of the containers. Further, let it be assumed that the piston head 226 is positioned near the right-hand side of the cylinder block. Also, the pushbutton for dispensing this liquid is not depressed, i.e., the valve in the liquor block is closed.

Upon pressing the pushbutton, there is a drop in pressure in the manifold 260. The diaphragm 264 instantly responds to the pressure differential on its opposite faces to insure closure of the valve 270, and the diaphragm 276 similarly operates to close the valve 278, which remains closed through the check of valve 208. Due to the higher fluid pressure in the inlet manifold 220 and branch 222, the piston 226 is moved to the left, thereby forcing a volume of liquid out of the manifold 260 equal to the volume displaced by the piston.

The check valve 208 is a metered valve, and, upon operation of the associated pushbutton, functions after a predetermined pressure decay to establish a pressure level in the recess 248 such that the diaphragm 276 operates to open the valve 278. Thereupon, the diaphragm 264 operates to permit the valve 270 to open so that fluid from the manifold 220 passes through the recess 240 and into the recess 242, as through openings 282 extending from the bottom of the recess 240 to the opening in which the stem 268 moves.

This action results in fluid entering the left end of the cylinder block and forcing the piston 226 to the right. The rod 212 accordingly moves out of the housing and operates the actuator of the counter 214. Simultaneously when flow through the valve 278 sufficiently increases pressure in recess 244, port 258 and manifold 260—after valve 270 is opened but before the piston reaches its extreme right-hand position—such pressure increase is transmitted via check valve 208 and port 262 into the recess 248 to close valve 278. This completes the cycle of operation, which is repeated each time the pushbutton is pressed.

The above-described measure control is one which causes a predetermined quantity of liquid to be dispensed, but it requires that the pushbutton be released in order to permit pressure equalization and recycling before dispensing a similar quantity. Thus, if the pushbutton is held down long enough, additional liquid will flow after a short pause and the piston may not be operative to actuate the counter. FIG. 20 illustrates an arrangement for preventing this occurrence. FIG. 20 shows two blocks 88 stacked back to back. This is the same part shown in FIGS. 7, 10 and 11 for the water block. The upper block 88 is used to dispense liquors, and for this purpose the inlet port 128 is connected via the T 206 to the fluid outlet 204 of the housing 200. The valve structure and the parts therefor are identically arranged and operable as previously described, with the inlet ports 128 connected to respective parts of the inlet manifold block 186 (FIG. 15).

In the inverted lower block 88, the stem of the valve 110 is secured in a slidable disc 286, and the spring 120 extends between the disc and the adjacent end of the tubular element 108, so as to normally keep the valve head off the seat of the tubular element. The other end of the tubular element is closed, which may be by a plate over the lower surface of the lower block, or by a plug 288 as shown. In this example, the valve transfer rod is not used in the lower tubular element 108.

In the arrangement of FIG. 20, a T 290 connects the outlet 204 to the inlet port 128 of the upper block 88 and to the corresponding port 128 of the lower block 88. Another T 292 connects the return 210 of the housing 200 to a check valve 208' and to the remaining port 114 of the lower block 88. The valve 208' is not one with a metered back flow provision, i.e., it is a one-way valve only.

With the upper valve normally closed and the lower valve normally open, the pressures are all equalized. When the pushbutton is pressed, the lower valve closes, and opening of the upper valve immediately causes the check valve to check and retain the higher pressure in the adjacent recess 248 in the housing (FIG. 17) to close the valve 278. The resulting lower pressure in the lines from the outlet 204 (and the port 128 in the lower block 88) results in the piston moving to dispense the volume of liquid displaced thereby.

At the end of the piston stroke, no further liquid flows through the dispensing head because both valves 270, 278 are still closed. Since fluid from the inlet 202 cannot enter the recess 246 or pass through the valve 278, no fluid can pass from the inlet through the outlet. When the pin 106 is released to let the upper valve to close and the lower valve to open, the pressures in the lines upstream of the check valve 208 equalize with that in the recess 248, whereupon the diaphragm 276 responds to the pressure differential thereon to open the valve 278. Accordingly, the diaphragm 264 operates to open the valve 270 and effect fluid flow against the piston head moving it to its right-hand position. Therefore, this arrangement eliminates the opportunity for inadvertent or intentional dispensing of more liquid than the counter tally shows.

If desired, the above-described valves of FIG. 20 may be adapted for sequential operation wherein the normally open valve closes just before the normally closed valve opens. This may be effected, for example, by providing a through-pin to both valves that is fixed to one valve and slidable with respect to the other, with an override spring cooperable with such parts to effect closure of the lower valve immediately before opening of the upper valve. This arrangement would permit the higher pressure liquid on the downstream side of the check valve to be checked without any possibility of reduction when the pressure in the outlet 204 decreases.

The system of this invention is well suited to use disposable containers, e.g., plastic for liquors and syrups. Also, water may be supplied in disposable cartons, which can be thrown away after emptying them into the water container. For the gas pressure source, a $CO_2$ cylinder of the small size previously mentioned provides enough pressure for several full unit cycles, i.e., for several replacements of all liquor and syrup of containers.

Since the replacements can be made quickly, a self-contained unit of the invention is uniquely advantageous for portable units for airliners, convention halls and the like, and makes possible the dispensing of beverages in greater numbers than is possible at conventional fountains and bars. On the other hand, it will be appreciated that this invention is not limited to portable units, and that various features thereof may be used to form compact permanent installations.

What is claimed is:

1. A self-powered liquid measure control and dispensing system comprising:
   containers of respective liquids, each having an inlet port and an outlet port;
   a source of gas under pressure connected to the inlet port of each container;
   dispensing head means having, for each liquid, a respective pair of inlet and outlet ports between which is a respective manually operable valve that is normally biased to a closed position;
   and measure control means including a respective housing connected between the outlet port of each container and a dispensing head inlet port,
      said housing being filled with the liquid from the associated container,
      said housing including a chamber in which a piston is slidable between a first position and a second position,
      said piston upon opening of the associated dispensing head valve being forced from said first to said second position by liquid from the associated container,
      the stroke of said piston forcing a predetermined volume of liquid through the associated dispensing head outlet port,
      and means in said housing operable after said piston stroke to direct liquid against said piston to return it to said first position.

2. The combination of claim 1, wherein said dispensing head means includes a pair of blocks secured together with a sheet of flexible material between them,
   one of said blocks having valve openings therein;
   a respective valve in each opening in said one of said blocks, each valve including
      a tubular element fixed in its opening;
      a valve element at the end of said tubular element opposite said flexible sheet;
      a compression spring normally urging said valve element into seating engagement with said tubular element, the associated inlet and outlet ports in said one block being axially displaced on opposite sides of said opposite end of said tubular element;
      and a rigid element in said tubular element extending from said valve element to said flexible sheet;
   and a respective pin slidable in the other block and adapted to press said sheet and move said rigid element to unseat said valve element to connect said inlet and outlet ports through said tubular element.

3. The combination of claim 1, wherein a respective rod is secured to each piston and extends to the exterior of the housing;
   a respective counter mechanism for each liquid having an actuator in the path of the associated rod,
      said rod operating said actuator upon each cycle of movement of said piston between the two positions thereof.

4. The combination of claim 1, wherein each housing has first, second and third spaced openings therein;
   first and second diaphragms extending through the first and second openings, respectively,
   the housing having a first small opening extending between the portions of said first and second openings between said diaphragms,
   the housing having a second small opening extending between the third opening and the adjacent portion of said second opening;
   a first valve attached to said first diaphragm and adapted thereby to open and close said first small opening;
   a second valve in said third opening being attached to said second diaphragm and adapted thereby to open and close said second small opening;
   a piston slidable in said third opening between positions adjacent to and remote from said second valve;
   a fluid inlet to the housing from a respective container;
   means connecting said fluid inlet to the portion of the third opening remote from said second valve, to the portion of said second opening from which the second small opening extends, and to the portion of said first opening from which said first small opening extends;
   a fluid outlet from said housing;
   means connecting said fluid outlet to the remaining portion of said second opening and to the end of said third opening nearest said second valve;
   and a feedback connection from said fluid outlet to the remaining portion of said first opening.

5. The combination of claim 4, wherein said dispensing head means includes a respective additional valve operable simultaneously with each manually operable valve,
   said dispensing head means having additional inlet and outlet ports between which each additional valve is located;
   means for each additional valve normally biasing it to open position,
      whereby the additional inlet and outlet ports are normally in fluid communication,
      said additional valve being closed when the associated manually operable valve is opened;
   a fluid line connection between said additional outlet port and the fluid outlet from said housing;
   a fluid line connection between said additional inlet port and said remaining portion of said first opening in said housing;
   and a conventional one-way valve in said feedback connection.

6. The combination of claim 4, wherein said feedback connection includes a check valve with a metered back flow.

7. The combination of claim 1, further including a water container having an inlet and an outlet;
   a collapsible plastic membrane located in said water container and having its periphery releasably secured to said container between its said inlet and outlet,
      whereby to provide said water container with a first compartment and a second compartment,
      said second compartment being a potable water compartment,
      said first compartment being adapted to receive fluid under pressure for forcing water out of said potable water compartment;
   additional dispensing head means having an inlet port connected to said water compartment outlet, a manually operable control valve biased to a normally closed position, and an outlet port through which water from said second compartment is dispensed upon opening said control valve;
   and means coupling said water container inlet to said gas pressure source so that fluid pressure is constantly exerted against said membrane,
      said membrane functioning while said control valve is open to permit fluid in said inlet compartment to increase in volume as water in said water compartment decreases in volume, until said water compartment is empty.

8. The combination of claim 7, wherein the source of gas is a cylinder of carbon dioxide; and a fluid connection between said cylinder and said water container inlet.

9. The combination of claim 7, wherein said inlet compartment contains carbonated water;
a fluid connection between said cylinder and said water container inlet;
a further manually operable, normally closed valve in said dispensing head means located between a further pair of associated inlet and outlet ports;
and a fluid connection from said second compartment to said inlet port of said further pair,
whereby opening said further valve causes carbonated water to be dispensed through the outlet port of said further pair.

10. The combination of claim 1, wherein the source of gas is a cylinder of carbon dioxide;
further dispensing head means having a number of pairs of inlet ports with simultaneously movable manually operable valves therein that are normally biased to closed positions;
said further dispensing head means having a respective pair of outlet ports for each pair of inlet ports;
a source of carbonated water connected between said cylinder and one each of said pairs of inlet ports;
a number of containers of syrups to be mixed with carbonated water having respective inlet ports connected to said cylinder and outlet ports connected to the others of said pairs of inlet ports,
whereby operation of simultaneously movable valves causes carbonated water and a syrup to be mixed therewith to pass through the associated pair of outlet ports,
the outlet ports of each pair being dimensioned so that the syrup and carbonated water passing therethrough are in predetermined proportions;
and outlet means having a mixing chamber in fluid communication with the outlet ports of all pairs,
said mixing chamber being dimensioned to effect mixing of the carbonated water and syrup passing through an associated pair of outlet ports,
said mixing chamber terminating in a single discharge port through which each carbonated water and syrup mixture is dispensed.

11. The combination of claim 10, wherein said further dispensing head means includes upper and lower stacked blocks each with openings in which respective ones of said valves are housed,
the inlet ports connected to said carbonated water source being in one block,
the inlet ports connected to said number of containers being in the other block,
the valve openings in one of said blocks being coaxial with respective valve openings in the other block;
a sheet of flexible material between said blocks;
a top block secured to the upper of said pair of blocks,
said top block having respective openings aligned with the coaxial valve openings in the upper and lower blocks;
a second sheet of flexible material between said top block and said upper block;
a respective pin slidable in each opening in said top block and having its inner end abutting said second sheet;
and each of said valves including
a stationary tubular element in the valve opening;
a valve element to set against one end of said tubular element,
the associated inlet and outlet ports being axially spaced and with said one end of the tubular element between them;
and a rigid element in the tubular element extending from said one end thereof to the adjacent gasket sheet,
whereby pressing the pin against said second sheet causes both rigid elements to move through their tubular elements to unseat both valve elements and permit liquid and carbonated water to flow through the respective blocks to said pair.

12. The combination of claim 11, wherein said outlet means is a discharge block secured to the inlet port ends of said upper and lower blocks,
and said mixing chamber is a cavity in said discharge block spanning all of said outlet ports,
said discharge port being a relatively small opening in which said cavity terminates.

13. The combination of claim 12, further including an inlet manifold block secured to the inlet port ends of said upper and lower blocks,
said inlet block having a respective port connected between one of said number of containers and a respective inlet port in said lower block,
and said inlet block having a port connection to said carbonated water source and a single outlet opening spanning the inlet ports in said upper block.

14. In combination:
a housing having first, second and third spaced openings therein;
first and second diaphragms extending through the first and second openings, respectively,
the housing having a first small opening extending between the portions of said first and second openings between said diaphragms,
the housing having a second small opening extending between the third opening and the adjacent portion of said second opening;
a first valve attached to said first diaphragm and adapted thereby to open and close said first small opening;
a second valve in said third opening being attached to said second diaphragm and adapted thereby to open and close said second small opening;
a piston slidable in said third opening between positions adjacent to and remote from said second valve;
a fluid inlet to the housing for a respective container;
means connecting said fluid inlet to the portion of the third opening remote from said second valve, to the portion of said second opening from which the second small opening extends, and to the portion of said first opening from which said first small opening extends;
a fluid outlet from said housing;
means connecting said fluid outlet to the remaining portion of said second opening and to the end of said third opening nearest said second valve;
and a feedback connection from said fluid outlet to the remaining portion of said first opening.

15. In combination: first, second and third stacked blocks having respective sheets of flexible gasket material sandwiched between said first and second and said second and third blocks,
said blocks having aligned openings therein,
said second and third blocks each having a respective inlet port and outlet port connected to each opening therein;
a pin in each opening in said first block and a valve in each opening in said second and third blocks,
the aligned valves being adapted via said sheets for operation between open and closed positions upon pressing the associated pins against the adjacent sheet.

16. The combination of claim 15, wherein for each valve there is a fixed tubular element between the associated inlet and outlet ports;
a valve element adapted to seat against one end of said tubular element;
a spring biasing the valve element into seating engagement with said tubular element;
and a transfer element in said tubular element to transmit movement of the associated pin to unseat said valve element.

17. The combination of claim 15, wherein for each valve there is a fixed tubular element between the associated inlet and outlet ports;
- a valve element adapted to seat against one end of said tubular element;
- a spring for each valve in said second block biasing the valve element into seating engagement with said tubular element;
- a spring for each valve in said third block biasing the valve element away from seating engagement with said tubular element;
- a transfer element in each tubular element in said second block to transmit movement of the associated pin to unseat the valve element;
- and means in each valve in said third block operable upon movement of the associated pin to seat the valve element against said tubular element.

18. The combination of claim 15, including
an inlet manifold block secured to the inlet port ends of said second and third blocks,
- and having respective port connections to each inlet port;

and an outlet manifold block secured to the outlet port ends of said second and third blocks,
- said outlet manifold block having a cavity spanning all outlet ports in said second and third blocks, said cavity terminating in a reduced diameter discharge opening.

19. The combination of claim 15, wherein a predetermined number of said port connections in said inlet manifold block terminate in an opening spanning a predetermined number of said inlet ports in said second block.

References Cited

UNITED STATES PATENTS

| | | | |
|---|---|---|---|
| 3,240,395 | 3/1966 | Carver | 222—129.1 |
| 3,347,421 | 10/1967 | Yingst et al. | 222—129.1 |
| 3,428,218 | 2/1969 | Coja | 222—400.7 X |

ROBERT B. REEVES, Primary Examiner

J. P. SHANNON, Assistant Examiner

U.S. Cl. X.R.

222—129.4, 144.5